United States Patent
Osaki

(10) Patent No.: US 8,218,407 B2
(45) Date of Patent: Jul. 10, 2012

(54) DVD REPLAY DEVICE WITH INCORPORATED HARD DISK

(75) Inventor: Mitsuharu Osaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1051 days.

(21) Appl. No.: 11/860,620

(22) Filed: Sep. 25, 2007

(65) Prior Publication Data

US 2008/0080342 A1    Apr. 3, 2008

(30) Foreign Application Priority Data

Sep. 28, 2006  (JP) .................................. 2006-264504

(51) Int. Cl.
G11B 5/86   (2006.01)
G11B 5/09   (2006.01)

(52) U.S. Cl. ..................................................... 369/47.12

(58) Field of Classification Search ................ 369/47.12
See application file for complete search history.

(56) References Cited

U.S. PATENT DOCUMENTS

| | | | | |
|---|---|---|---|---|
| 2002/0047925 A1* | 4/2002 | Choi | .............................. | 348/552 |
| 2005/0163229 A1* | 7/2005 | Okada et al. | ............. | 375/240.28 |
| 2005/0213448 A1* | 9/2005 | Takahashi | .................. | 369/47.12 |
| 2005/0232609 A1* | 10/2005 | Eckleder | ........................ | 386/125 |
| 2006/0083485 A1* | 4/2006 | Kikuchi | ........................... | 386/95 |
| 2006/0165381 A1* | 7/2006 | Eckleder et al. | ................ | 386/95 |
| 2007/0031125 A1* | 2/2007 | Nakatsu | ......................... | 386/112 |
| 2007/0133945 A1* | 6/2007 | Fukushima et al. | ............ | 386/95 |
| 2007/0280646 A1* | 12/2007 | Seita et al. | ...................... | 386/96 |
| 2007/0292105 A1* | 12/2007 | Kamio | ............................ | 386/52 |

FOREIGN PATENT DOCUMENTS

JP       2005276389       10/2005

* cited by examiner

*Primary Examiner* — Thai Tran
*Assistant Examiner* — Sunghyoun Park
(74) *Attorney, Agent, or Firm* — Pillsbury Winthrop Shaw Pittman, LLP

(57) ABSTRACT

This DVD replay device with incorporated hard disk includes a DVD drive which reads data from a DVD, and a HDD which performs recording of data upon, and reading of data from, a HD which has a first storage region and a second storage region. Furthermore, this DVD replay device with incorporated hard disk includes a control means which, when dubbing of data is commanded, decides whether or not the data upon the DVD is recorded in the DVD-VIDEO format, and a selection means which receives a selection as to whether the speed of the dubbing should be a first speed or a second speed. And, if the data upon the DVD is recorded in the DVD-VIDEO format, if the second speed has been selected, the HDD records the data recorded upon the DVD into the first storage region of the HD just as it is in the DVD-VIDEO format.

4 Claims, 6 Drawing Sheets

DVD REPLAY DEVICE WITH INCORPORATED HARD DISK

CROSS REFERENCE

This Nonprovisional application claims priority under 35 U.S.C. §119(a) on Patent Application No. 2006-264504 filed in Japan on Sep. 28, 2006, the entire contents of which are hereby incorporated by reference.

BACKGROUND OF THE INVENTION

The present invention relates to a DVD replay device which incorporates a hard disk, including a DVD drive which reads data from a DVD (Digital Versatile Disk), and a hard disk drive (hereinafter termed a "HDD") which performs recording of data upon a HD (hard disk) and reading of data recorded thereupon.

From the prior art, there is per se known a DVD replay device with incorporated HD, which incorporates a DVD drive and a HDD.

With this type of DVD replay device with incorporated HD, when dubbing of data from a DVD in the DVD-VIDEO format is being performed, the recording formats of these two devices are different. Due to this, with such a DVD replay device with incorporated HD, a dubbing method is employed in which the data recorded upon the DVD is dubbed while being converted from the DVD-VIDEO format to the VR (Video Recording) format. Here, the DVD-VIDEO format is a format which is dedicated to replay, and is a format in which editing after recording is impossible. Furthermore, the VR format is a format in which editing can be performed after recording.

It should be understood that there has been proposed, in Japanese Laid-Open Patent Publication 2005-276389, an information recording and replay device which copies data from a DVD to a HD without conversion of recording format.

However, with the above described dubbing method in which the recording format of the data is converted, a time period is required which is equal to the recording time of the DVD. For example, if the recording time of the DVD is ten hours, then a time period of ten hours is required for performing dubbing while converting the recording format of the data. Here, the recording time of the DVD is the replay time period which is required for performing normal replay of the DVD.

Due to this, even though the DVD may be loaded into the DVD drive with the user anticipation of performing dubbing quickly and removing the DVD after a short time period, nevertheless the user is forced to wait during the entire recording time period of this DVD. Thus, with a DVD replay device with incorporated HD according to the above described prior art, there has been the problem that the convenience of use for the user (i.e. the usability) is bad.

The objective of the present invention is to provide a DVD replay device with incorporated HD, in which the time period required for dubbing of data from the DVD to the hard disk is shortened, so that the convenience of use for the user is enhanced.

SUMMARY OF THE INVENTION

The DVD replay device with incorporated hard disk according to the present invention includes a DVD drive which reads data from a DVD loaded thereinto, and a hard disk drive which performs recording of data upon, and reading of data from, a hard disk which has a first storage region for storing data in the DVD-VIDEO data recording format, and a second storage region for storing data in the VR data recording format. With this structure, this DVD replay device with incorporated hard disk is, for example, a DVD player with incorporated hard disk or a DVD recorder with incorporated hard disk. Moreover, the VR format is a data recording format which is different from the DVD-VIDEO format.

Furthermore, this DVD replay device with incorporated hard disk also includes a control means which, when dubbing of data from the DVD to the hard disk is commanded, decides whether or not the data upon the DVD loaded into the DVD drive is recorded in the DVD-VIDEO format.

Yet further, this DVD replay device with incorporated hard disk also includes a selection means which receives a selection as to whether the speed of the dubbing should be a first speed or a second speed. In this structure, this second speed is set to be a higher speed than the first speed.

And, if the data upon the DVD is recorded in the DVD-VIDEO format, the control means performs control in the following manner:

(A) if the second speed has been selected by the selection means, the control means supplies the data recorded upon the DVD to the hard disk drive, and moreover commands the hard disk drive to record the data in the first storage region of the hard disk just as it is in the DVD-VIDEO format; and (B) if the first speed has been selected by the selection means, the control means supplies the data recorded upon the DVD to the hard disk drive, and moreover commands the hard disk drive to record the data in the second storage region of the hard disk while converting the DVD-VIDEO format into the VR format.

With this structure, the control means performs either the processing of (A) or the processing of (B), according to the result of selection by the selection means. If the user wishes to finish dubbing quickly, then he selects the second speed for the dubbing speed, using the selection means.

DETAILED DESCRIPTION OF THE INVENTION

In the following, embodiments of the DVD recorder with incorporated HD according to the present invention will be explained with reference to the figures.

Figure 1:
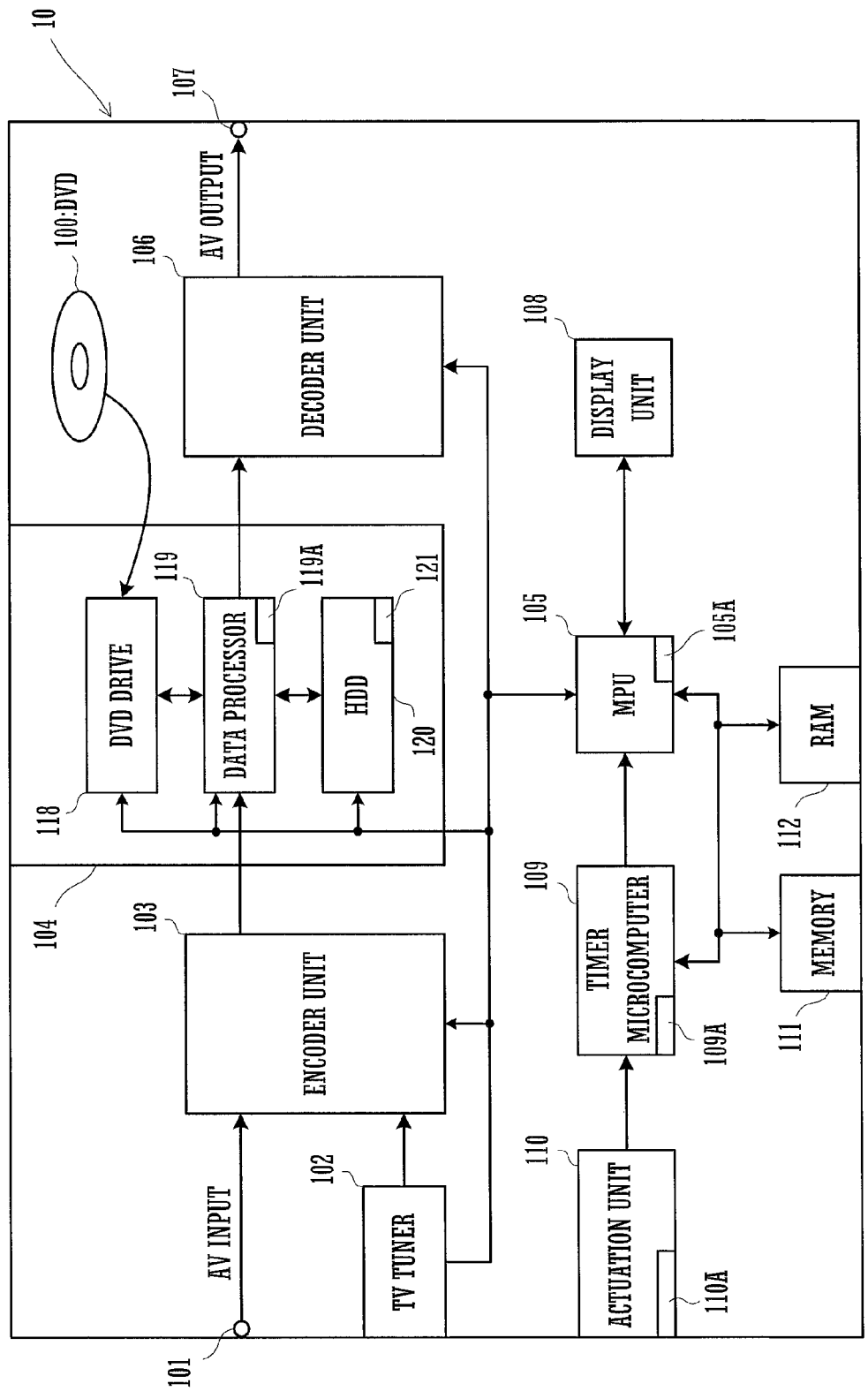
FIG. 1 is a block diagram showing the structure of a DVD recorder with incorporated HD which is an embodiment of the present invention.

FIG. 1 is a block diagram showing the structure of a DVD recorder with incorporated HD which is an embodiment of the present invention. This DVD recorder with incorporated HD 10 comprises a recording and replay unit 104 which records upon a predetermined medium data which has been inputted according to a recording command, or replays recorded data according to a replay command, and a micro computer (a MPU, in other words a main control device) 105 which controls the operation of the various sections of this DVD recorder with incorporated HD 10.

The recording and replay unit 104 comprises a DVD drive 118 which performs recording of data (such as broadcast programs or the like) upon a DVD 100 and replay of data therefrom, a HDD (hard disk drive) 120 incorporating a HD (hard disk) 121 which is capable of recording data at a higher capacity than the DVD 100, and a data processor 119.

It should be understood that the DVD 100 may be, for example, a HD DVD, a DVD-ROM, a DVD-R, a DVD-RW, or a DVD-RAM.

The DVD drive 118 irradiates laser light from a pickup head upon a DVD 100 which is loaded thereinto, and thereby reads data from the DVD 100.

On the other hand, the HDD 120 houses internally the HD 121 and a magnetic head (not shown in the figures). And the HDD 120 performs recording of data upon the HD 121 and reading of data therefrom by using this magnetic head. Moreover, the HDD 120 is endowed with a conversion function of converting the recording format of data which is recorded upon the HD 121, or of data which is to be recorded upon the HD 121.

The data processor 119 comprises a buffer memory 119A which is capable of temporarily storing a constant amount of data read in from the HD 121 or the DVD 100.

And, according to control from the MPU 105, the data processor 119 supplies data for recording which has been outputted from an encoder unit 103 to the DVD drive 118, or reads in a replay signal for the DVD 100 from the DVD drive 118 and supplies it to the decoder unit 106.

Furthermore, according to control from the MPU 105, the data processor 119 supplies recording data which has been outputted from the encoder unit 103 to the HDD 120, and supplies a replay signal from the HDD 120 to a decoder unit 106.

Moreover, according to control from the MPU 105, the data processor 119 supplies data which has been outputted from the DVD drive 118 to the HDD 120, and supplies data which has been outputted from the HDD 120 to the DVD drive 118.

Yet further, according to control from the MPU 105, the data processor 119 writes data which has been recorded upon the DVD 100 or the HD 121, and performs deletion of data which has been recorded thereupon.

At an AV input terminal 101, a video signal and an audio signal and the like which are to be the subject of recording are inputted from externally to this DVD recorder 10 with incorporated HD, and are outputted to an encoder unit 103 which is connected to this AV input terminal 101.

A tuner 102 is connected to an antenna (not shown in the figures) at which a television broadcast signal is received. And this tuner 102 extracts the broadcast signal of some selected channel from the television broadcast signal received by the antenna, and outputs this broadcast signal to the encoder unit 103.

The encoder unit 103 encodes and compresses a video signal and an audio signal which are inputted from the AV input terminal 101 or the tuner 102 (for example by MPEG2), and outputs the result to the data processor 119 as data for recording.

The decoder unit 106 decodes and expands a replay signal which has been outputted from the recording and replay unit 104. An AV output terminal 107 is connected to this decoder unit 106, for supplying the replay signal which has thus been decoded to a replay device such as a television or the like.

A timer microcomputer 109 comprises a timer circuit (clock unit) 109A which is utilized for time management of this DVD recorder with incorporated HD 10. And an actuation unit 110 is connected to this timer microcomputer 109, and receives actuation (commands) from the user.

Moreover, a display unit 108 which displays the operational state of this DVD recorder with incorporated HD, a memory 111 which stores a control program in which a control method for the various sections of this DVD recorder with incorporated HD, and a RAM 112 which serves as a working space for deployment of data and the like data processed by this control program, are all connected to the MPU 105. The memory 111 may be, for example, an EEPROM or a ROM.

The MPU 105 includes a register 105A which is of high speed but small capacity. And, according to a control program which is stored in the memory 111, the MPU 105 controls recording of data upon the HD 121 and upon the DVD 100, reading and deletion of data therefrom, video recording operation corresponding to video recording actuation inputted via the actuation unit 110, display operation by the display unit 108, and so on.

Furthermore, the MPU 105 acquires management information for the DVD 100 or the hard disk 121 from the DVD drive 118 or the HDD 120. Due to this, the MPU 105 is able to check the amount of data upon the DVD 100 and upon the HD 121 internal to the HDD 120, the remaining capacity thereupon, and the recording format of this data.

The actuation unit 110 comprises a video recording key for is video recording upon a medium, a replay key for replaying data which is video recorded upon a medium, a dubbing key for commanding dubbing upon the HD 121 from the DVD 100, a selection key for receiving selection of whether this dubbing is to be performed as high speed dubbing or as low speed dubbing, and other actuation keys. This actuation unit 110 transmits control signals corresponding to actuation of these keys to the MPU 105. Furthermore, by actuation of these keys, the user is able to perform video recording, replay, and so on.

Moreover, the actuation unit comprises a data reception unit 110A which receives control signals transmitted from a remote control (a remote control terminal) not shown in the figures.

The display unit 108 is, for example, a monitor. This display unit 108 displays a selection message which invites the user to select whether dubbing should be performed as high speed dubbing or as low speed dubbing.

It should be understood that the speed of such low speed dubbing corresponds to the "first speed" of the Claims. Moreover, the speed of such high speed dubbing corresponds to the "high speed" of the Claims.

Furthermore, the RAM 112, the microcomputer 109, the data processor 119, and the MPU 105 correspond to the "control means" of the Claims.

Figure 2:
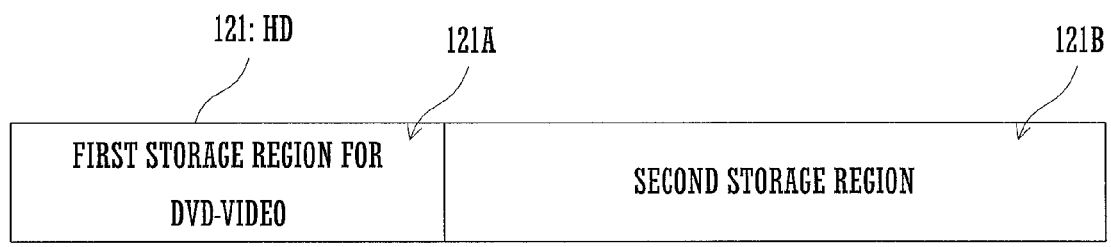
FIG. 2 is a figure showing the storage region of a HD 121.

FIG. 2 is a figure showing the storage region upon the HD 121. This hard disk 121 is divided into a first storage region 121A for storing data in the DVD-VIDEO format, and a second storage region 121B for storing broadcast programs or the like. This second storage region 121B is a region for, principally, storing data in the VR format.

Figure 3:
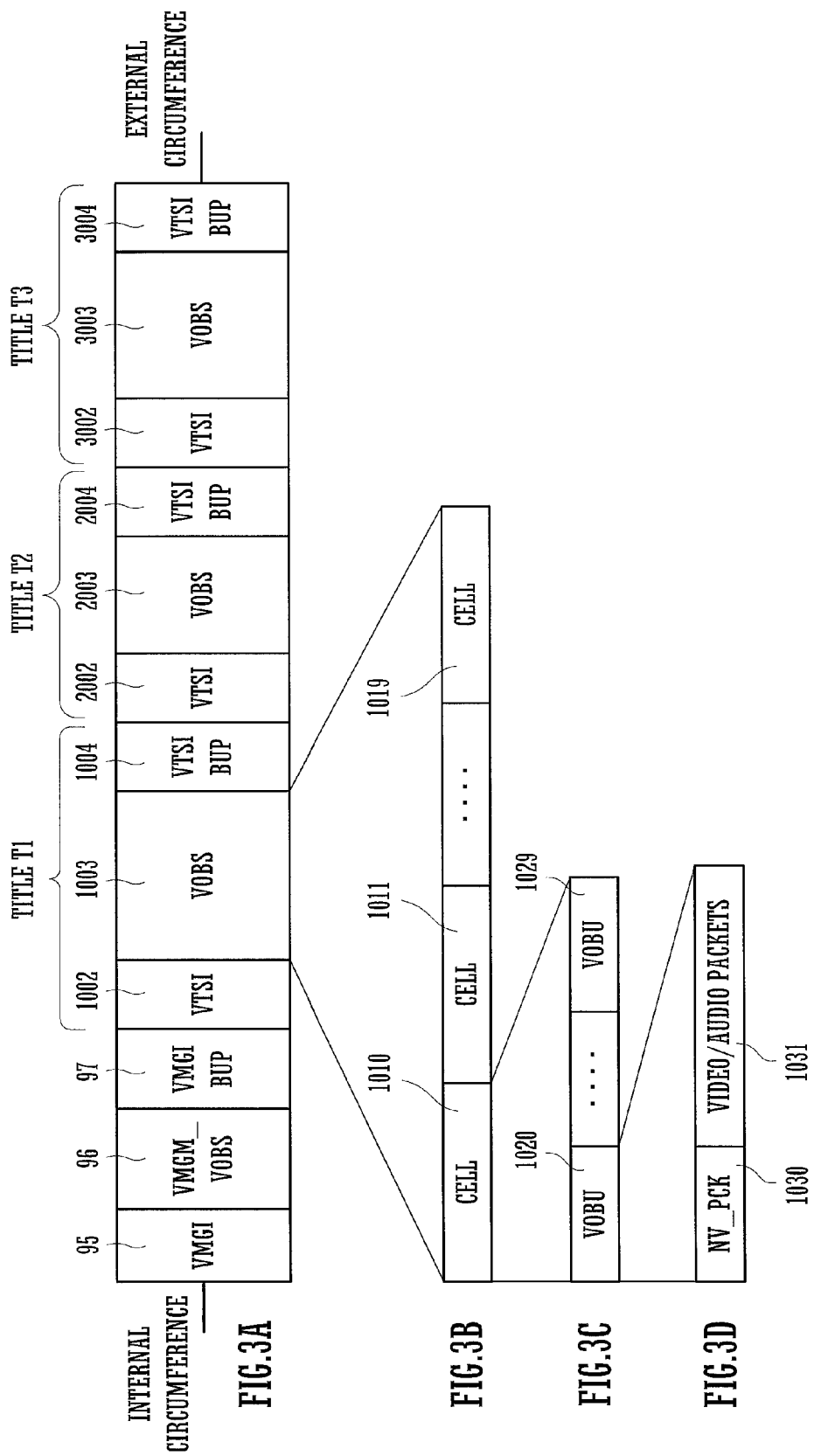
FIGS. 3A through 3D are figures showing the data structure of data upon a DVD which is recorded in the DVD-VIDEO format.

FIGS. 3A through 3D are figures showing the data structure of data upon a DVD which is recorded in the DVD-VIDEO format. As shown in FIG. 3A, upon this DVD which is recorded in the DVD-VIDEO format, there are recorded, in order from its internal circumference towards its external circumference, regions VMGI 95, VMGM_VOBS 96, VMGIbup 97, and regions for titles T1~T3.

In the region VMGI (Video Manager Information) 95 there is described information (control information) related to overall replay of DVD-VIDEO, and information for a so called route menu. In the region VMGM_VOBS (Video Object Set for VMG Menu) 96 there is described information used by a title menu. Furthermore, sometimes herein there is also described information (control information) related to overall replay of DVD-VIDEO, including VTSI address information and so on.

The region VMGIbup 97 is a backup file for VMGI 95.

Furthermore, the region for the title T1 consists of regions VTSI (Video Title Set Information) 1002, VOBS (Video Object Set) 1003, and VTSIbup 1004 (refer to FIG. 3A). In the DVD-VIDEO format, a maximum of 99 titles can be recorded. In FIG. 3A, three titles are recorded.

In the region VTSI 1002, control information for the region VOBS 1003 is described.

In the region VOBS 1003, contents for title replay is described. In this region VOBS 1003, as shown in FIG. 3B, there are included a plurality of cells 1010~1019.

In the region VTSIbup, there is described a backup file for VTSI 1002.

In the DVD-VIDEO format, the data is recorded in cell units which are determined in advance.

The cell 1010 consists of a plurality of VOBUs (Video Object Units) 1020~1029 (refer to FIG. 3C). The maximum number of cells for one title is 255 cells.

A packet NV_PCK (Navigation Packet) 1030 is placed at the head of the VOBU 1020, and next video data and audio data (AV data) or the like is inserted in packetized form (refer to FIG. 3D)

In the DVD-VIDEO format the data is recorded in order from the start, in so to speak one single stroke, for example. Due to this, with the DVD-VIDEO format, it is not possible to perform editing of the data after it has been recorded.

Figure 4:
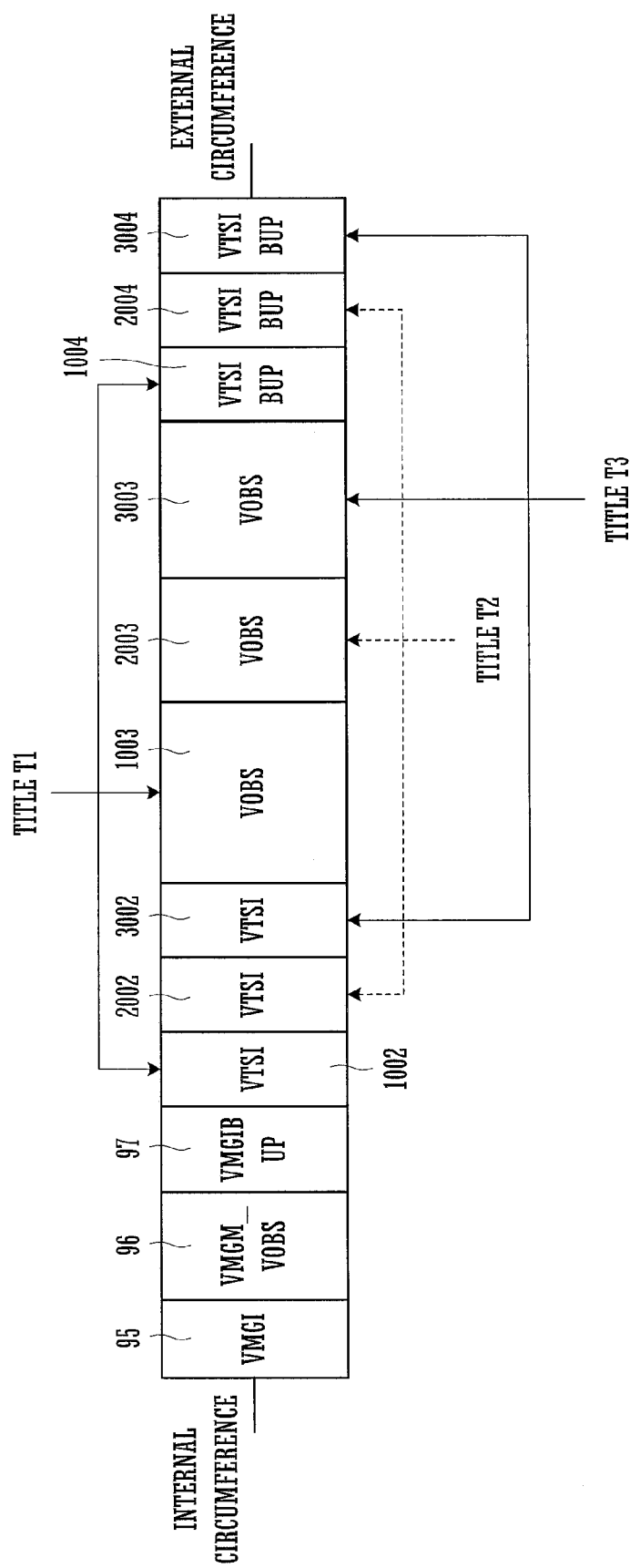
FIG. 4 is a figure showing the data structure of data upon a DVD which is recorded in the VR format.

FIG. 4 is a figure showing the data structure of data which is recorded upon a DVD 100 in the VR (Video Recording) format. As compared with the data structure of data which is recorded upon the DVD in the DVD-VIDEO format (refer to FIG. 3A), the data structure of such data which is recorded upon a DVD in the VR format is compatible with regard to the arrangement of the regions VMGI 95, VMGM_VOBS 96, and VMGIbup 97, as shown in FIG. 4.

However, as shown in FIG. 3A and FIG. 4, the arrangement with regard to each individual title is different. While in the FIG. 3A arrangement the regions VTSI, VOBS, and VTSIbup for each individual title are arranged in succession and constitute one consecutive set, in the FIG. 4 arrangement they do not constitute a set. On the contrary, in FIG. 4, all of the regions VTSI for all of the titles are arranged consecutively in succession, followed by all of the regions VOBS for all of the titles arranged consecutively in succession, and then followed by all of the regions VTSIbup for all of the titles arranged consecutively in succession. In this VR format, it is possible to perform editing of the data after it has been recorded.

It should be understood, although the details thereof are not shown in the figure, that, in this VR format, cells 1010~1019, VOBUs 1020~1029, NV_PCKs 1030, and video/audio packets 1031 are present and are arranged in a similar manner to their arrangement in the data structure for data upon the DVD 100 recorded in the DVD-VIDEO format (refer to FIG. 3A).

Figure 5:
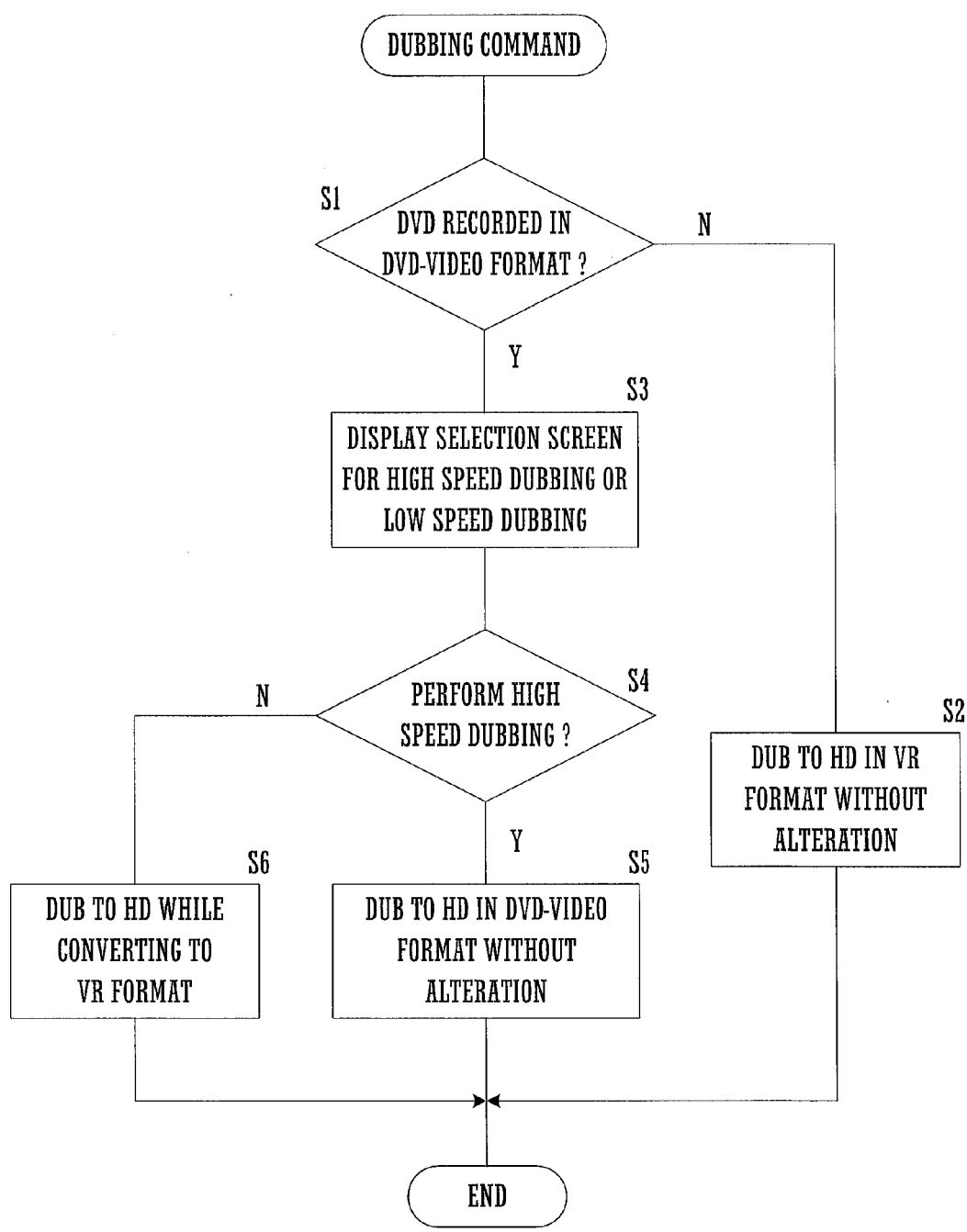
FIG. 5 is a flow chart showing operations performed by an MPU of a DVD recorder with incorporated HD which is an embodiment of the present invention.

FIG. 5 is a flow chart showing operations performed by an MPU of a DVD recorder with incorporated HD which is an embodiment of the present invention. This operation is an operation which is performed when dubbing of data from a DVD 100 to the HD 121 has been ordered.

When the user depresses the dubbing key of the actuation unit 110, the MPU 105 makes a decision (a step S1) as to whether or not the recording format for the data which is recorded upon the DVD 100 is the DVD-VIDEO format. This decision is performed by acquiring the management information from the DVD 100, and by referring to this information.

If it is decided that the recording format is not the DVD-VIDEO format, in other words that it is the VR recording format, then the MPU 105 dubs the data upon the DVD 100 into the second storage region 121B of the HDD 120 (a step S2), and then this processing terminates. To describe this step S2 in detail, the MPU 105 commands the DVD drive 118 to read the data from the DVD 100. And the MPU 105 commands the HDD 120 to record the data which has been read by the DVD drive 118 in the second storage region 121B just as it is in the VR format without alteration.

On the other hand, if it is decided that the recording format is the DVD-VIDEO format, then the MPU 105 displays a selection message upon the display unit 108 which invites the user to select whether to perform dubbing at high speed or at low speed (a step S3). This selection message may be, for example, "Please choose whether to perform high speed dubbing or low speed dubbing.". The user views this selection message upon the display unit 108, and selects whether to perform dubbing at high speed or at low speed by using a selection key upon the actuation unit 110.

In this manner, the user is able to select whether the dubbing speed should be high speed or low speed, according to his own method of use. Due to this, the convenience of use from the point of view of the user is enhanced. Furthermore, the user is able to recognize the necessity for selecting the dubbing speed, since a selection message is displayed upon the display unit 108 in the step S3.

And the MPU 105 makes a decision as to whether or not high speed dubbing has been selected upon the actuation unit 110 (a step S4).

If it is decided in the step S4 that high speed dubbing is being selected upon the actuation unit 110, then the MP 105 dubs the data upon the DVD 100 into the first storage region 121A of the HDD 120 just as it is in the DVD-VIDEO format without alteration (a step S5), and then this processing terminates. To describe this step S5 in detail, the MPU 105 commands the DVD drive 118 to read the data from the DVD 100. And the MPU 105 commands the HDD 120 to record the data which has been read by the DVD drive 118 in the first storage region 121A just as it is in the DVD-VIDEO format without alteration.

Here, if the recording time upon the DVD 100 is ten hours, then ten hours is required for dubbing while converting the recording format of the data. However, the dubbing in the step S5 is dubbing without any conversion of recording format. Due to this, it is acceptable to transfer the data to the HDD 120 just as it is without conversion, and only about one hour will be a sufficient time for performing the dubbing of the step S5.

According to the above, it is possible to shorten the time period which is required for dubbing of the data from the DVD 100 to the hard disk 121. In other words, the time period during which the user is forced to wait is shortened. Because of this, it is possible for the user to remove the DVD from this DVD recorder with incorporated HD after having performed dubbing quickly. Accordingly, it is possible to enhance the convenience of use from the point of view of the user.

On the other hand, if in the step S4 it is decided that low speed dubbing is being selected upon the actuation unit 110, then the MPU 105 commands the HDD 120 and so on to perform dubbing of the data upon the DVD 100 into the second storage region 121B while converting this data to the VR format (a step S6), and then this processing terminates. Due to this, the DVD drive 118 reads out the data from the DVD 100 and outputs it to the data processor 119. And the data processor 119 transfers this data to the HDD 120. Finally, the HDD 120 records this transferred data in the second storage region 121B of the hard disk 121 while converting it to the VR format.

Moreover, as an embodiment of the present invention, the following variant embodiment may also be employed.

-A Variant Embodiment-

Figure 6:
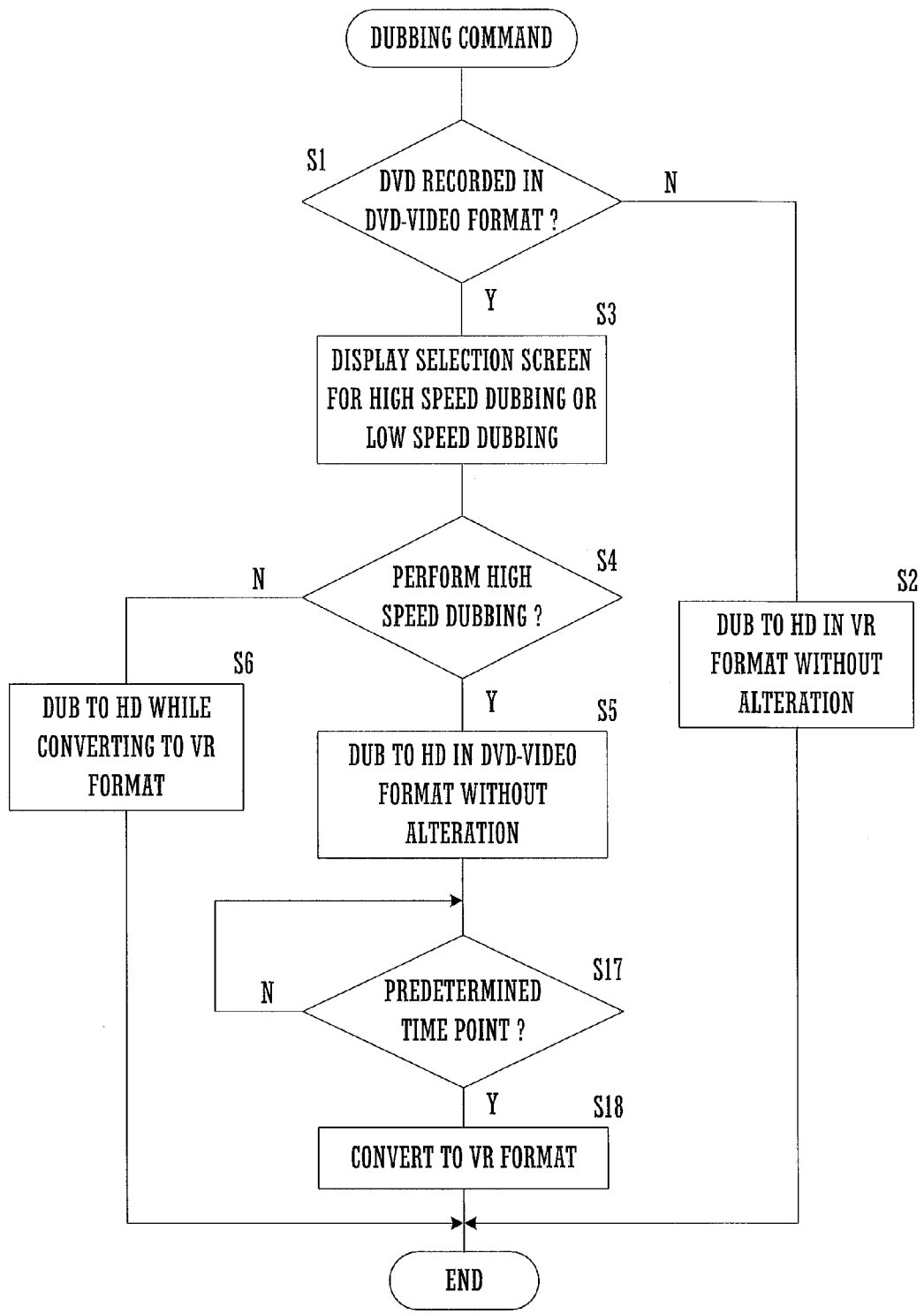
FIG. 6 is a flow chart showing operations performed by an MPU of a DVD recorder with incorporated HD which is a variant embodiment of the present invention.

FIG. 6 is a flow chart showing operations performed by an MPU of a DVD recorder with incorporated HD which is a variant embodiment of the present invention. These operations are the same as the operations of FIG. 5, with additional steps S17 and S18 appended after the step S5; i.e., apart from this feature, the same steps (S1~S6) are performed as in the first embodiment described above.

At a predetermined time point after executing the step S5 described above (the step S17), the MPU 105 commands the HDD 120 to dub the data which has been recorded in the first storage region 121A of the hard disk 121 into the second storage region 121B thereof while converting it to the VR format (a step S18). In the step S17, the MPU 105 gets the present time instant from the timer micro computer 109, and decides whether or not the predetermined time point has arrived. And, in the step S18, the HDD 120 records the data which has been recorded in its first storage region 121A into its second storage region 121B while converting this data to the VR format. The predetermined time instant may be set by the user in a time slot in which this DVD recorder with incorporated HD 10 is not being used. The predetermined time instant may be, for example, in a time slot in the dead of night. The MPU 105 is made aware of this predetermined time instant by the timer micro computer 109.

By doing this, it is possible to provide space in the first storage region 121A for the next episode of high speed dubbing. Furthermore, since the dubbing into the second storage region 121B is performed in a time slot in the dead of night in which the user is not using this recorder with incorporated HD 10, accordingly the user is not forced to wait during the dubbing procedure. Thus it is possible to enhance the convenience of use from the point of view of the user by yet a further level.

It should be understood that it is desirable for this recorder with incorporated HD 10 to be made to wait in a standby state, waiting for its power supply to be turned ON, from after the above described step S5 is executed until the predetermined time instant. In other words, during this standby state, the MPU 105 prohibits supply of electrical current to the DVD drive 118 and to the HDD 120. In this standby state, power is only supplied to the timer microcomputer 109, the MPU 105, the RAM 112, and the memory 111. And, when the current time arrives at the predetermined time instant, then the MPU 105 turns the power supply to this recorder with incorporated HD 10 to ON.

Due to this, it is possible to suppress the consumption of electrical power during the period from after the step S5 described above is executed, until the predetermined time instant.

Furthermore, it would also be acceptable to provide, upon the actuation unit 110, a designation key which receives designation of the above described predetermined time instant. By doing this, the user is able to set the predetermined time is instant freely as he wishes.

What is claimed is:

1. A DVD replay device with incorporated hard disk, comprising:
   a DVD drive which reads data from a DVD loaded thereinto;
   a hard disk drive which performs recording of data upon, and reading of data from, a hard disk which has a first storage region for storing data of a first data structure, and a second storage region for storing data of a second data structure that differs from the first data structure;
   control means which, when dubbing of data from the DVD to the hard disk is commanded, decides whether or not the data upon the DVD loaded into the DVD drive is recorded in the first data structure; and
   selection means which receives a selection as to whether the speed of the dubbing should be a first speed or a second speed which is higher than the first speed, and
   wherein, if the data upon the DVD is recorded in the first data structure,
   (A) upon the second speed being selected by the selection means, the control means: (i) supplies the data recorded upon the DVD to the hard disk drive; (ii) commands the hard disk drive to record the data, in the first storage region of the hard disk just as it is in the first data structure; and (iii) causes the DVD replay device with incorporated hard disk to wait in a standby state, in which it waits for its power supply to be turned ON, from completing the command of (ii) until the predetermined time instant; (iv) turns on the DVD reply device with incorporated hard disk when the predetermined time instand after the command of (ii) arrives; and (v) commands the hard disk drive to record the data recorded in the first storage region, in the second storage region while converting the data from the first data structure to the second data structure, and
   (B) upon the first speed being selected by the selection means, the control means: (i) supplies the data recorded upon the DVD to the hard disk drive; and (ii) commands the hard disk drive to record the data, in the second storage region of the hard disk while converting the data from the first data structure to the second data structure.

2. The DVD replay device with incorporated hard disk according to claim 1, further comprising display means which, when the dubbing is commanded, displays a selection message inviting the user to select, with the selection means, whether to perform the dubbing at the first speed or at the second speed.

3. The DVD replay device with incorporated hard disk according to claim 1, further comprising designation means which receives designation of the predetermined time instant.

4. The DVD replay device with incorporated hard disk according to claim 1, wherein in the standby state, while receiving power supply, the control means prohibits power supply to the DVD drive and the hard disk drive.

* * * * *